United States Patent [19]

Hyodo et al.

[11] Patent Number: 5,287,349
[45] Date of Patent: Feb. 15, 1994

[54] ATM EXCHANGE SYSTEM

[75] Inventors: Ryuji Hyodo; Susumu Eda; Kenji Tanaka; Katsumi Oomuro; Osamu Sekihata; Hiroyuki Hatta; Reiko Furuya; Hirokazu Minou; Tetsuo Nishino; Eisuke Iwabuchi, all of Kawasaki, Japan

[73] Assignee: Fujitsu Limited, Kawasaki, Japan

[21] Appl. No.: 831,791

[22] Filed: Feb. 5, 1992

[30] Foreign Application Priority Data

Feb. 5, 1991 [JP] Japan .................................. 3-14236

[51] Int. Cl.⁵ .............................................. H04L 12/56
[52] U.S. Cl. ................................................. 370/60.1
[58] Field of Search ................. 370/60, 60.1, 58.1, 370/58.2, 58.3, 94.1, 94.2, 13, 17, 66, 68, 68.1

[56] References Cited

U.S. PATENT DOCUMENTS 4,630,259 12/1986 Larson et al. ......................... 370/13
5,058,104 10/1991 Yonehara et al. ..................... 370/13

FOREIGN PATENT DOCUMENTS 3605927 8/1987 Fed. Rep. of Germany .
54-82103 6/1979 Japan ............................ H04N 1/00
61-216545 9/1986 Japan ............................ H04L 11/20
1-47149 2/1989 Japan ............................ H04L 11/20
1-284042 11/1989 Japan ............................ H04L 11/20

OTHER PUBLICATIONS

Patent Abstracts of Japan, vol. 6, No. 147 (E-123)(1025), Aug. 6, 1982 & JP-A-57 069951, Apr. 30, 1982.
Proceedings of the International Switching Symposium 1990, vol. 5, May 28, 1990, Stockholm, SE, pp. 21-26; T. Koinuma et al., "An ATM Switching System based on a distributed control architecture".
PTR Philips Telecommunication and Data Systems Review, vol. 48, No. 2, Jun. 1990, Hilversum, NL, pp. 15-22; W. Krick, "ATM-A transfer concept not only for broadband services".

Primary Examiner—Wellington Chin
Attorney, Agent, or Firm—Staas & Halsey

[57] ABSTRACT

An ATM exchange system includes a unit for detecting management cells from among multiplexed input ATM cells, and a path creating unit dedicated to the detected management cell. The path creating unit is activated each time the management cell detecting unit detects the management cell, and thus the management cell is transferred to the corresponding outgoing line without loss in the exchange, and can be transferred thereto before a user ATM cell.

16 Claims, 18 Drawing Sheets

| Fig. 9A | Fig. 9B |

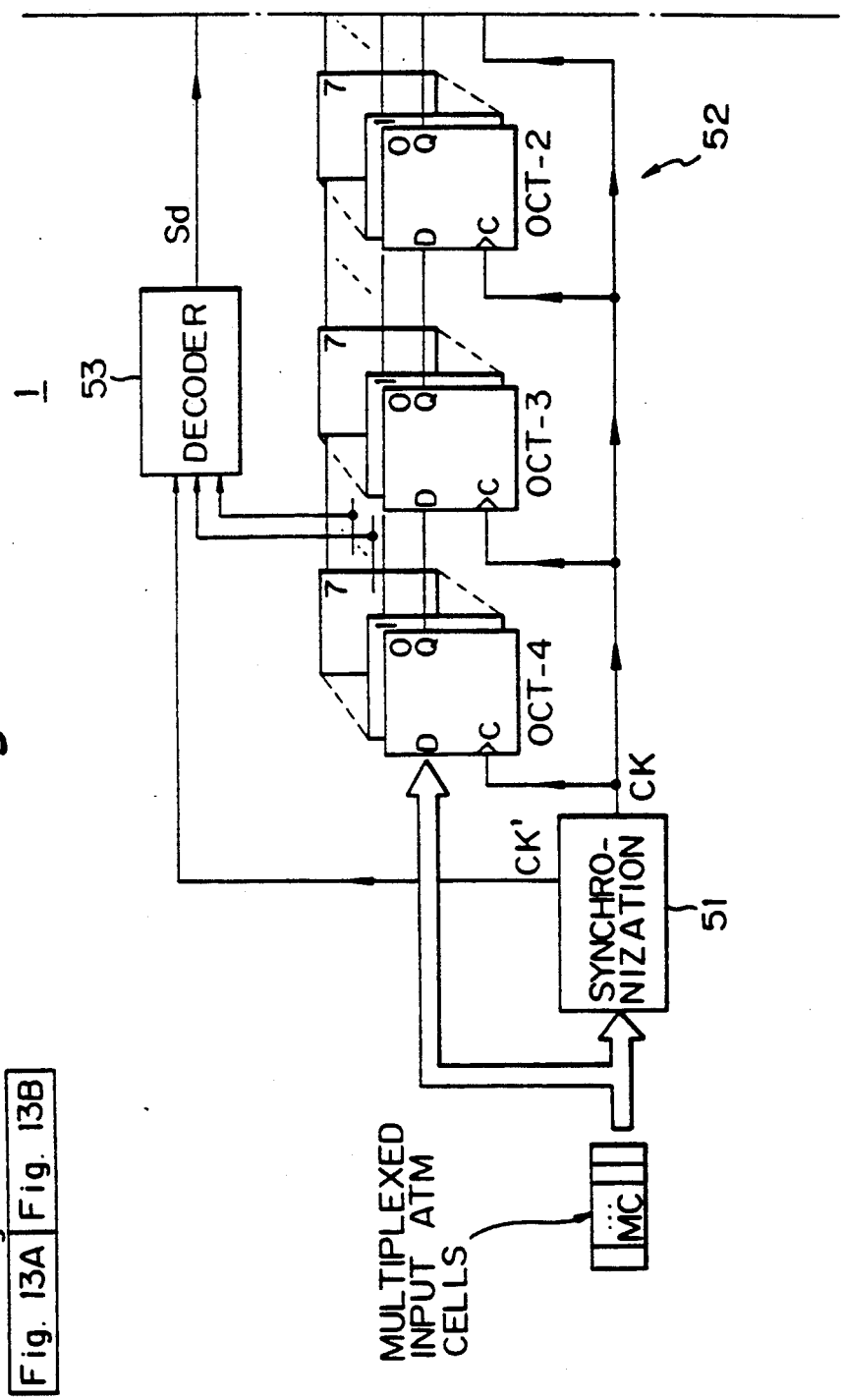

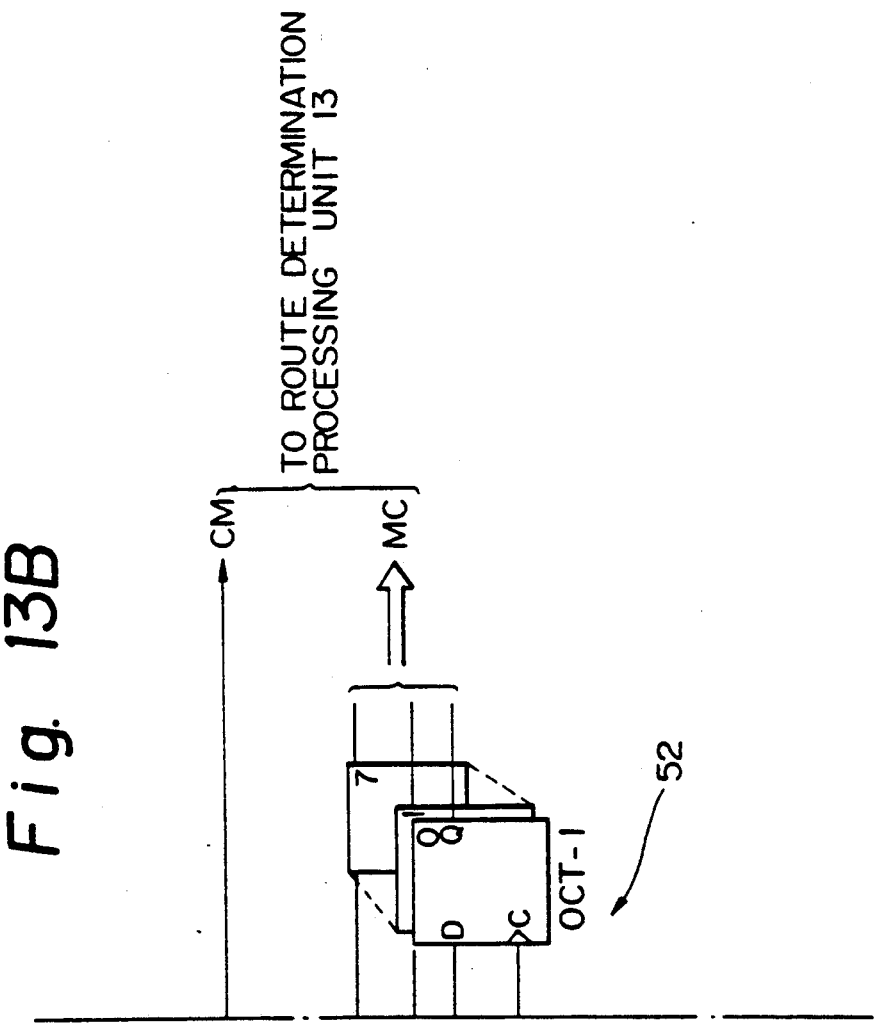

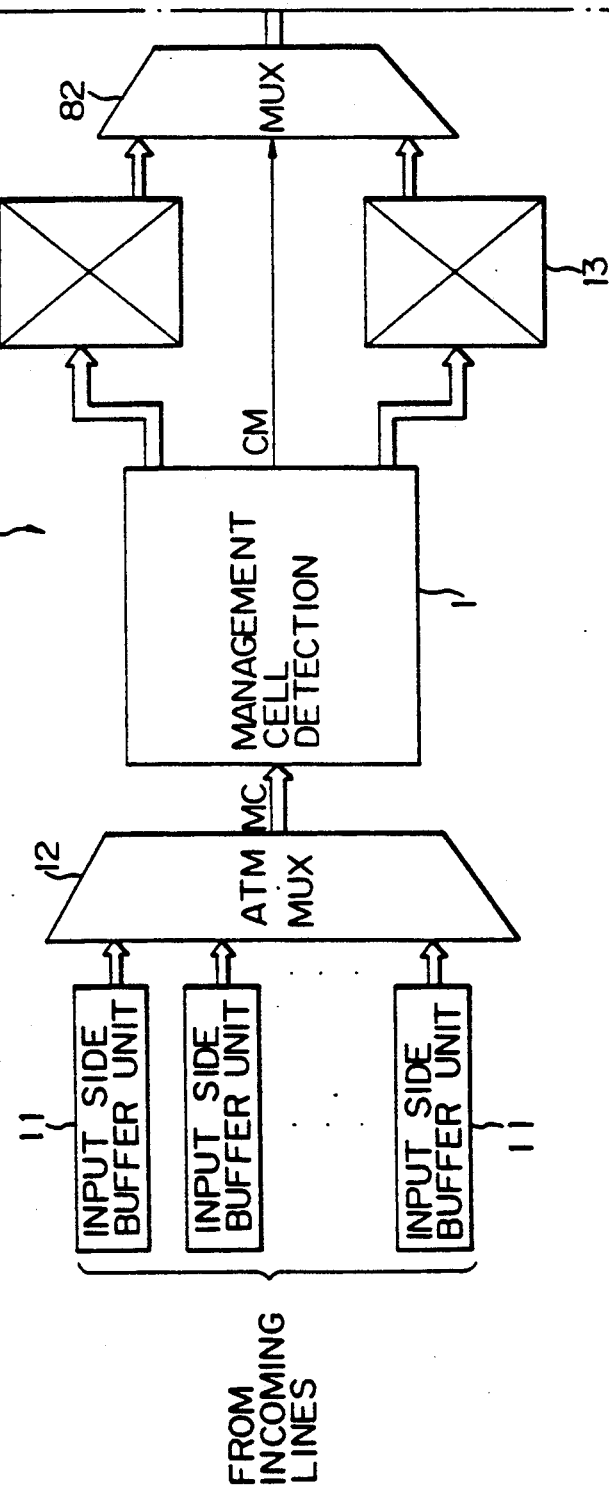

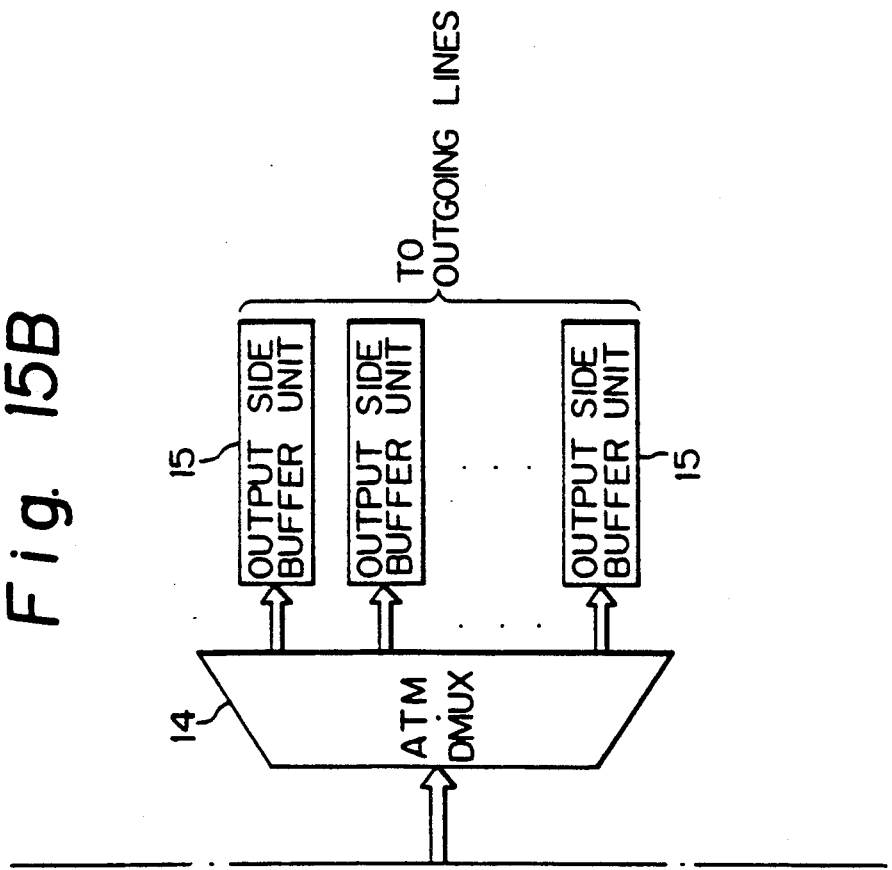

ATM EXCHANGE SYSTEM

BACKGROUND OF THE INVENTION

1. Field of the Invention

The present invention relates to an asynchronous transfer mode (ATM) exchange system, and more particularly, to an ATM exchange system comprising: a route determination processing unit for receiving multiplexed ATM cells obtained by multiplexing the ATM cells given from each incoming line, and determining each route for the respective received ATM cells; an ATM demultiplexing unit for demultiplexing the output multiplexed ATM cells from the route determination processing unit; and output side buffer units disposed at each outgoing line, for momentarily storing respective ATM cells output from the ATM demultiplexing unit.

The ATM exchange is essential when setting up an ATM communication network, and performs a switching of information of each subscriber terminal by dividing the information into cells. When putting the ATM communication network into practice, various problems that must be solved arise. The present invention is particularly focused on one of these problems, i.e., a technique for performing a switching of a management cell having a high priority and input during a switching of usual ATM cells.

2. Description of the Related Art

In general, two kinds of ATM cells are used; a usual ATM cell to be used by users, in which, the payload composed of general user data is mapped, and an ATM cell which is a management cell and is necessary to the operation and management of the ATM communication network. The payload of the management cell is mapped with important data such as, "SEND", "AIS", information for measuring an absolute delay time, information for notification of a by-pass route and so on. In more detail, the "SEND" data is information used for notifying the subscriber (call origination side) of a service interruption when a signal reception failure occurs at another subscriber (call receiving side); the "AIS" data is information used for notifying a line disconnection; the delay-time measuring data is information used for finding a transmission delay time of the cell, with a high accuracy; and the by-pass route notification data is information used for notifying the other subscriber of the related route when a by-pass route is selected due to traffic congestion or the occurrence of a line fault. Among this management information, if the "SEND" and "AIS" information in particular is not promptly transferred through the ATM exchange, serious damage to the service will occur. Accordingly, management cells containing such information as "SEND", "AIS", and the like are deemed to be management cells having a high priority.

As explained in detail hereinafter, the ATM exchange continuously receives the ATM cells, one by one, from the incoming lines, momentarily stores same therein, and finally, outputs same to the outgoing lines. During the above process, a cell discard may occur, according to a traffic condition of the received cells, and in this case, if the cell discard occurs with respect to the ATM cells containing the user data, the cell discard does not have a serious effect on the overall ATM communication network, per se.

Contrary to the above, if the cell discard occurs with respect to an ATM cell having a high priority, i.e., a management cell important to the system, the cell discard has a very serious effect on the overall ATM communication network per se.

Even if such cell discard does not occur under congested traffic conditions, an adverse transfer delay of the management cells will occur since, in the ATM exchange, the first-in cell becomes the first-out cell and thus a waiting time for each ATM cell is prolonged under such congested traffic conditions.

In consideration of the above, a measure for suppressing cell discards and transfer delays must be used in the ATM exchange system, and such measure has been proposed, although not in the field of the ATM exchange systems but in the field of a packet exchange system for handling packets. Nevertheless, the measure applicable to the packet exchange system cannot be applied to the ATM exchange system because, even though the packets are analogous to the ATM cells, the construction of the system of the packet exchange is very different from that of the ATM exchange.

SUMMARY OF THE INVENTION

Therefore, in view of the above problems, an object of the present invention is to provide an ATM exchange system in which the adverse cell discard of the management cells having a high priority, and undesirable transfer delays when cells are passing through the ATM exchange, do not occur.

To attain the above object, the ATM exchange system includes a means for detecting a management cell among ATM cells input to the ATM exchange, and a means for creating a dedicated path for transferring only the thus-detected management cell to the corresponding outgoing line, before transferring the other ATM cells.

BRIEF DESCRIPTION OF THE DRAWINGS

The above object and features of the present invention will be more apparent from the following description of the preferred embodiments with reference to the accompanying drawings, wherein:

FIG. 13 shows how FIGS. 13A and 13B form a diagram of a detailed example of first means 1 shown in FIG. 11;

FIG. 15 shows how FIGS. 15A and 15B form a diagram of an ATM exchange system according to the third embodiment of the present invention.

DESCRIPTION OF THE PREFERRED EMBODIMENTS

Before describing the embodiments of the present invention, the prior art and the problems therein will be first described with reference to the related figures.

Figure 1:
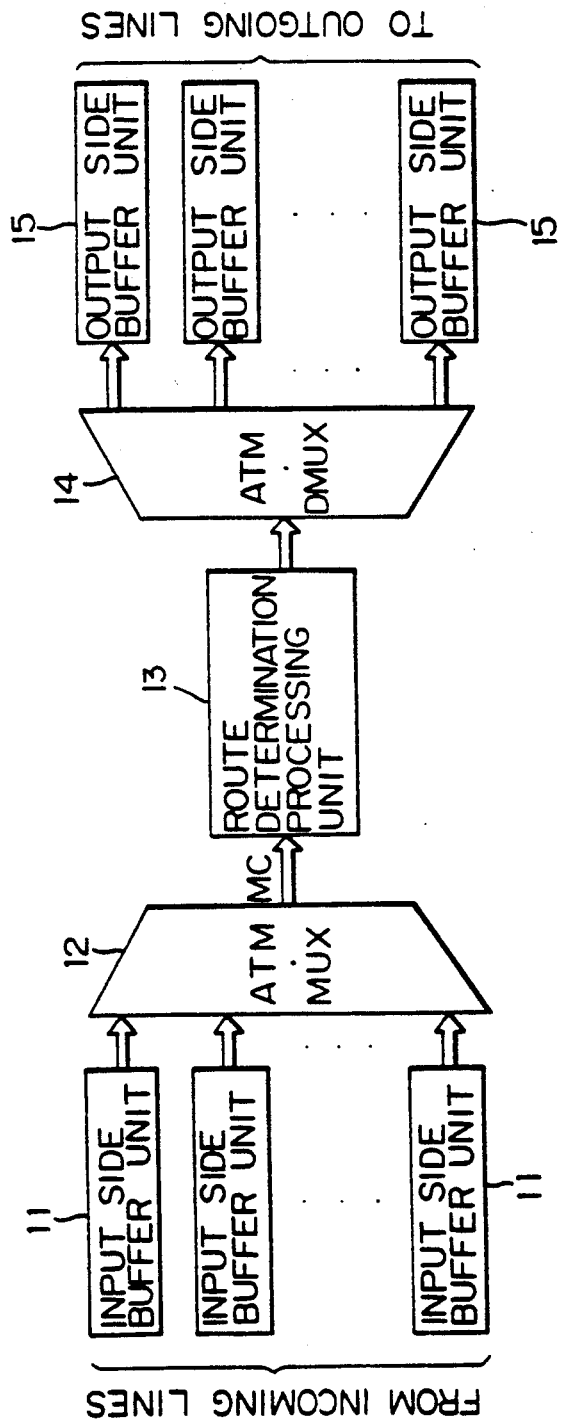
FIG. 1 illustrates a basic structure of a conventional ATM exchange system.

FIG. 1 is a view illustrating a basic structure of a conventional ATM exchange system. In FIG. 1, reference numeral 11 denotes an input side buffer unit for momentarily storing the ATM cells received from the corresponding incoming line. The input side buffer units 11 are disposed at each respective incoming line.

An ATM multiplexing unit (ATM·MUX) 12 multiplexes the ATM cells momentarily stored in the input side buffer units 11, to thereby obtain multiplexed ATM cells, whereby the momentarily stored ATM cells can be processed with a high efficiency by the multiplexing.

The thus-obtained multiplexed ATM cells MC are input to a route determination processing unit 13, i.e., an ATM switch unit, in which each input ATM cell is subject to a processing needed for determining the route along which each cell is to be transferred. In accordance with the above route determination processing, each ATM cell is input, after a demultiplexing of the multiplexed ATM cells at an ATM demultiplexing unit (ATM·DMUX) 14, to the corresponding one of output side buffer units 15, and the demultiplexed ATM cells are momentarily stored therein. Each of the output side buffer units 15 is connected to a respective outgoing line.

In one case, the outgoing line is directly connected as is to each subscriber's terminal, but in other cases, the outgoing lines are connected to other modes, i.e., ATM exchanges. The first-mentioned ATM exchange is a User-Network (UN) type ATM exchange, and the second-mentioned ATM exchange is a Node-Network (NN) type ATM exchange, i.e., a relaying exchange. The present invention is applicable to both the UN and NN type ATM exchanges.

Figure 2:
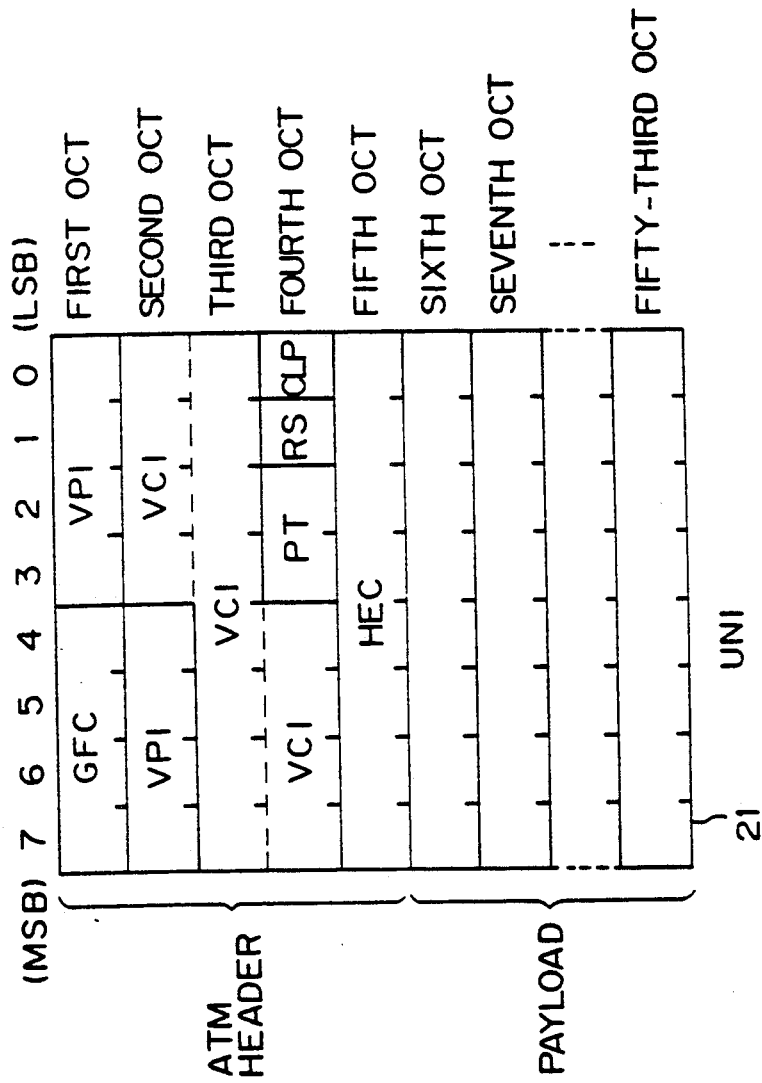
FIG. 2 depicts a format of an ATM cell passing through an ATM exchange.

FIG. 2 depicts a format of an ATM cell passing through an ATM exchange, and in particular, the figure depicts a format of a UNI type ATM cell 21 used in a UN type ATM exchange, wherein "I" represents an interface. Note that the format is specified by the CCITT and accordingly, is commonly used.

Figure 3:
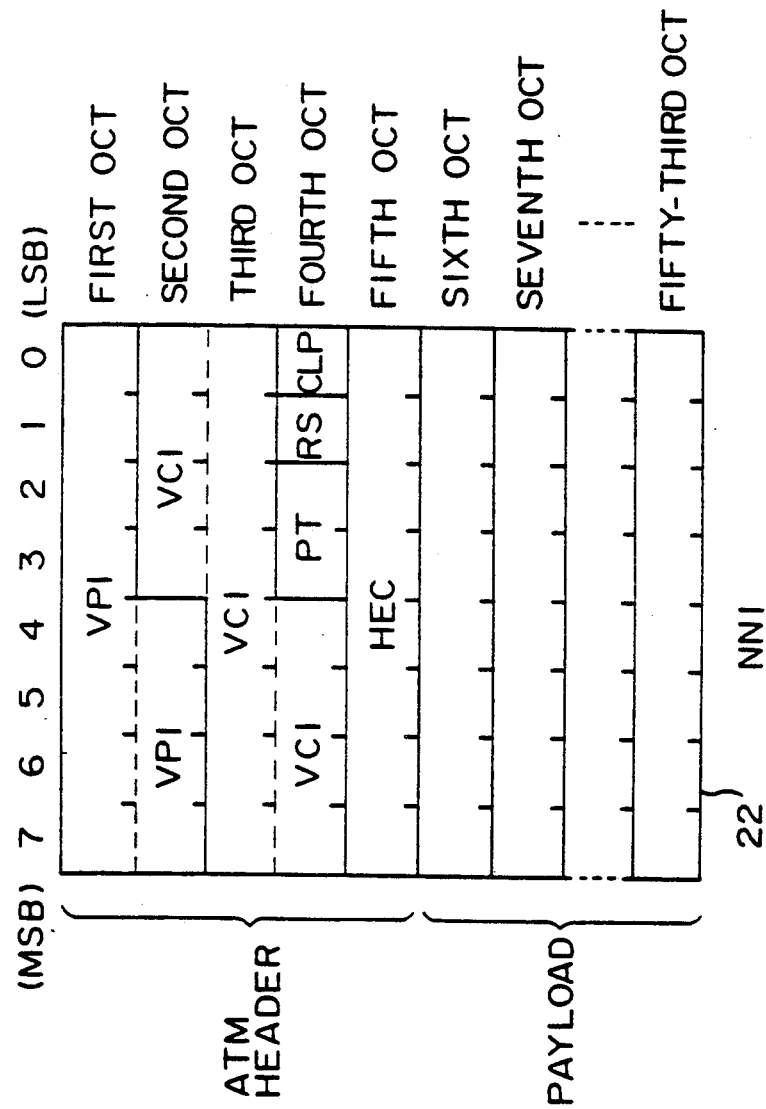
FIG. 3 depicts a format of another ATM cell passing through an ATM exchange.

FIG. 3 depicts a format of another ATM cell passing through an ATM exchange, and in particular, the figure depicts a format of an NNI type ATM cell 22 used in an NN type ATM exchange. This format is also specified by the CCITT and accordingly, is commonly used.

Returning to FIG. 1, the operation of the known ATM exchange will be explained below with reference to FIGS. 2, 3 and 4.

Figure 4:
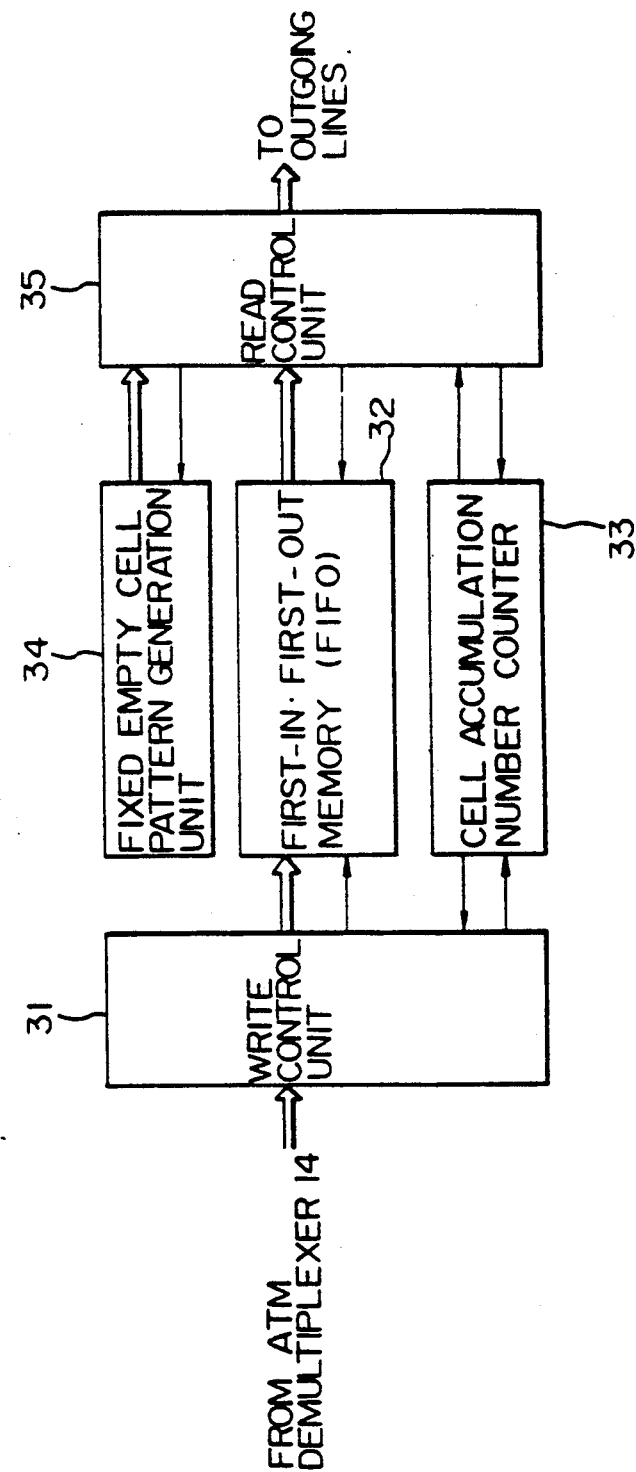
FIG. 4 illustrates an example of a structure of a conventional output side buffer unit.

FIG. 4 illustrates an example of a structure of a conventional output side buffer unit. Note, the output side buffer unit of FIG. 4 represents one of the output side buffer units shown in FIG. 1, but all such units have the same construction. Further note, in FIG. 4 each double-line arrow indicates a data flow of each cell, and each single line arrow indicates a sending and receiving of control information.

Referring again to FIG. 1, (1) The ATM cells input from the incoming lines and stored in the input side buffer unit 11 are multiplexed at the ATM multiplexing unit 12, to provide multiplexed ATM cells MC, and the ATM cells MC are sent to the route determination processing unit 13.

(2) The route determination processing unit 13 confirms the VPI/VCI values of the thus-input ATM cells, and based on these VPI/VCI values, retrieves a table contained in the processing unit 13, whereby information on the outgoing lines can be obtained. Alternatively, new VPI/VCI values are created, if necessary. Note, the characters VPI represent a Virtual Path Identifier and the character VCI represent a Virtual Circuit Identifier. The VPI and VCI are shown in FIGS. 2 and 3, and are values used for specifying a destination of the related ATM cell.

(3) The route determination processing unit 13 relocates the VPI/VCI values, if necessary, in accordance with the result of the above process (2).

(4) Utilizing the result of the above process (2), the route determination processing unit 13 then stores the ATM cells subjected to the above process (3), via the ATM demultiplexing unit 14, to the corresponding output side buffer unit 15.

Further, referring to FIG. 4, (1) A write control unit 31 confirms a priority level for a cell discard of the input ATM cells, and determines a threshold level utilized for the cell discard during cell traffic congestion.

(2) The write control unit 31 determines the number of the cells currently stored in a First-In-First-Out memory (FIFO) 32, by determining the value of a cell accumulation number counter 33.

(3) Result of the determining of the number of accumulated cells, during the above process (2), (a) if the above determined number of the cells exceeds the threshold level determined in the above process (1), the cell or cells just received are discarded.

(b) If the above determined number of the cells does not exceed the threshold level determined in the above process (1), the cell now received is written to the FIFO 32, and at the same time, the value of the cell accumulation number counter 33 is incremented by 1.

Similarly, at the output side of the structure shown in FIG. 4, (1) When a timing occurs at which it is possible to receive the cell at the unit 35, the read control unit 35 determines the number of cells currently stored in the FIFO 32, by determining the value of the cell accumulation counter 33.

(2) Based on the result of the above process (1), (a) If the number of cells is equal to or larger than 1, the ATM cell is read out from the FIFO 32 and transmitted over the outgoing line, and at the same time, the value of the cell accumulation counter 33 is decremented by 1.

(b) If the result of the above process (1) is zero, the read control unit 35 activates a fixed empty cell pattern generation unit 34, to output therefrom a fixed pattern expressing an empty cell, and transmits same over the outgoing line. The fixed pattern empty cell corresponds to an ATM cell in which, to the payload thereof, e.g., all "1" or all "0", is written. Further, the VCI value is set as "0", the VPI value is set as "0", and the CLP value is set as "1". The characters CLP denote a Cell Loss Priority.

As mentioned above, the ATM cells are sequentially input and stored, one by one, to the FIFO 32, and then sequentially transmitted over the outgoing lines. In this case, a cell discard may occur depending on the traffic conditions for the ATM cells. As mentioned before, if a cell discard of ATM cells containing the user data occurs, such a cell discard does not have a serious effect on the overall ATM communication network, per se.

Contrary to the above, if the cell discard of an ATM cell having a high priority occurs, i.e., a discard of a management cell, which is important to the system, such a cell discard has a very serious effect on the overall ATM communication network, per se.

Even if such a cell discard does not occur under congested traffic conditions, it is obvious that, under such conditions, the FIFO 32 will store therein a number of the ATM cells close to the limited number thereof that can be accommodated in the FIFO 32. In this case, a long waiting time occurs before the high priority management cell can be output from the FIFO 32, and this leads to an adverse delay in transmission.

Figure 5:
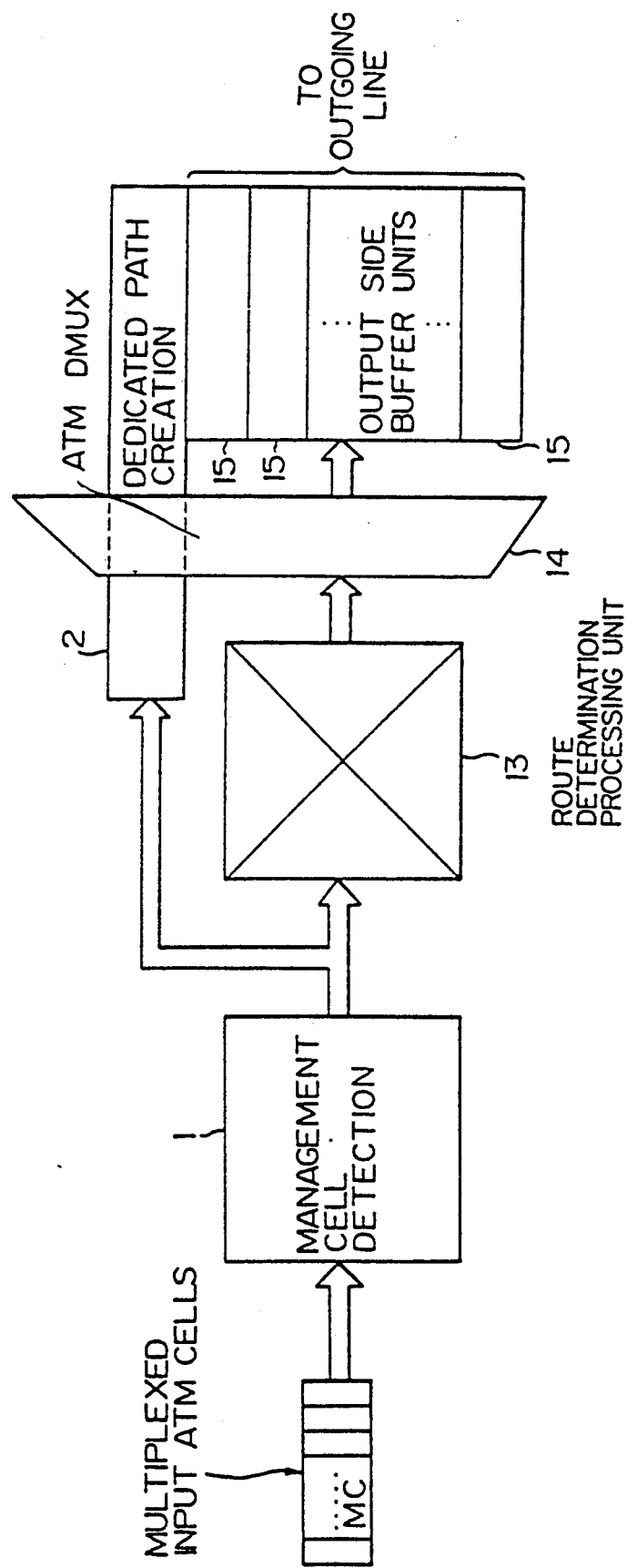
FIG. 5 illustrates a principle of the construction of the ATM exchange system according to the present invention.

FIG. 5 illustrates a principle of the construction of the ATM exchange system according to the present invention. In FIG. 5, the ATM exchange system is basically the same as that shown in FIG. 1, and comprises: a route determination processing unit 13 for receiving multiplexed input ATM cells from incoming lines and determining respective routes to which each ATM cell is to be switched; an ATM demultiplexing unit 14 for receiving the switched ATM cells from the route determination processing unit 13 and demultiplexing same; and output side buffer units 15 for momentarily storing the corresponding ATM cells received from said ATM demultiplexing unit 14, and transmitting same over the outgoing lines.

Essentially, the ATM exchange system of the present invention is featured by a further inclusion of two means 1 and 2. Namely, the ATM exchange system further includes: a first means 1 located at the input side of the route determination processing unit 13, i.e., the ATM switch for detecting a management cell from among the multiplexed input ATM cells; and a second means 2 for creating a dedicated path, when the first means 1 detects the management cell, for a transfer of only the detected management cell over the corresponding outgoing line.

The ATM exchange system of the present invention can transfer the management cell over the corresponding outgoing line without loss, since the management cell is handled separately from the usual ATM cells liable to be discarded if a congestion of the cell traffic occurs.

Further, the ATM exchange system of the present invention can transfer the management cell to the corresponding outgoing line without a long delay, since the management cell is given a highest priority among the ATM cells to be sent over the corresponding outgoing line.

Figure 6:
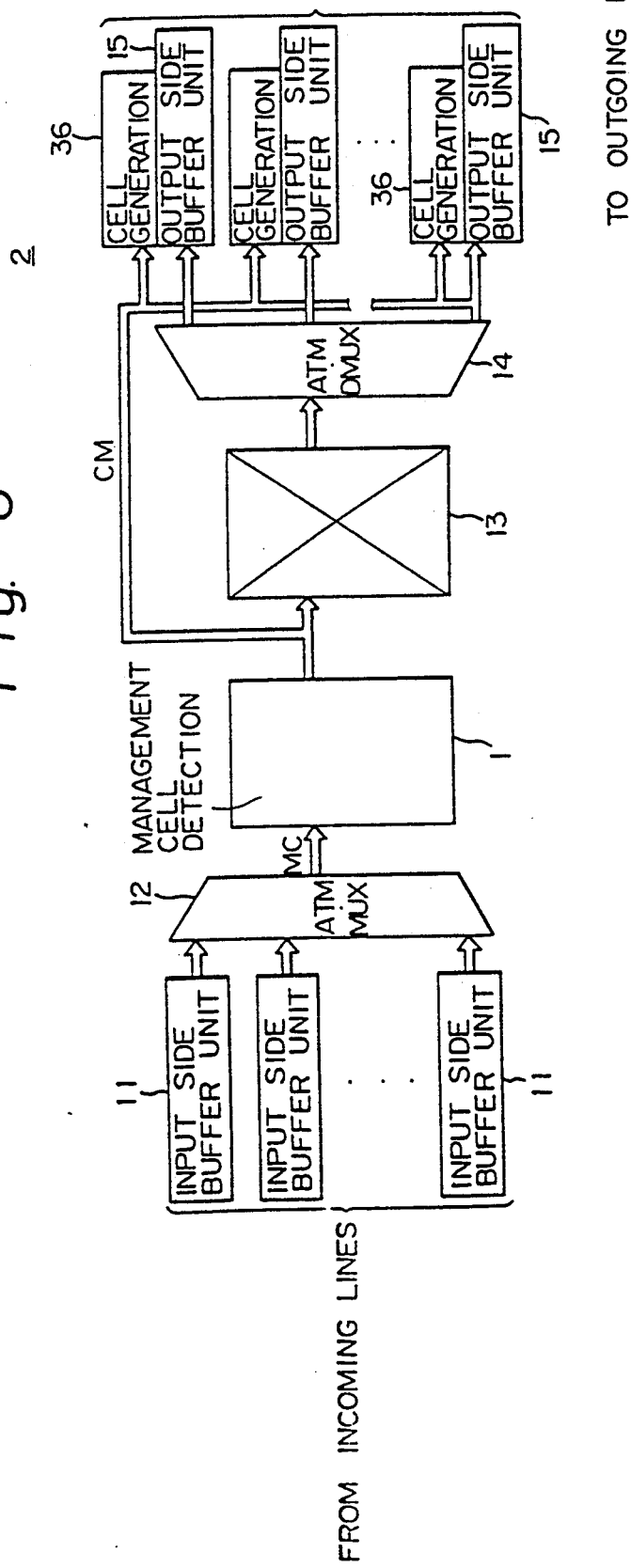
FIG. 6 illustrates an ATM exchange system according to the first embodiment of the present invention.

FIG. 6 illustrates an ATM exchange system according to the first embodiment of the present invention. As seen from FIG. 6, the second means 2 of FIG. 5 is composed of management cell generation units 36 disposed at each output side buffer unit 15, and each of the management cell generation units 36 regenerates a reproduced management cell in response to the input management cell detected by the first means 1. The reproduced management cell is analogus to the detected input management cell, and is transmitted over the corresponding outgoing line.

Namely, each input multiplexed ATM cell is monitored, at the input side of the route determination processing unit 13, by the first means 1 for detecting the management cell, and if the first means 1 detects a high priority cell, i.e., a management cell, the thus-detected management cell is immediately copied at the management cell generation unit 36. Thereafter, the cell copy, i.e., the reproduced management cell, is transmitted over the corresponding outgoing line.

Accordingly, even if the original input management cell is discarded, no problem arises because the thus-discarded cell can be saved by the copy thereof. Further, no adverse delay arises when the cell is passed through the ATM exchange, because it is not necessary to pass the reproduced input management cell through the FIFO 32 shown in FIG. 4.

In more detail, as shown in FIG. 6, when the management cell detection means 1 detects a high priority ATM cell, i.e., the input management cell, the means 1 promptly issues a command CM for a generation of the analogous management cell, and upon receipt of the command CM by the management cell generation unit 36, the unit 36 regenerates a management cell analogous to the input management cell, i.e., a copy thereof, which copy is promptly output over the corresponding outgoing line.

In the above case, the command CM for generation of the analogous management cell is accompanied by payload data and header data necessary for obtaining the above copy. The content of the payload data is composed of the previously mentioned "SEND", "AIS" and so on. The content of the header data is composed of the values of the previously mentioned PT, VPI, VCI and so on. Note, the meaning of the VPI and VCI has been explained in item (3) with reference to FIG. 1. The characters PT represent a payload type, and are shown in FIGS. 2 and 3. Note, the fundamental operation carried out in the system of FIG. 6 is identical to the fundamental operation carried out in the system of FIG. 1, and has been explained with reference thereto.

Figure 7:
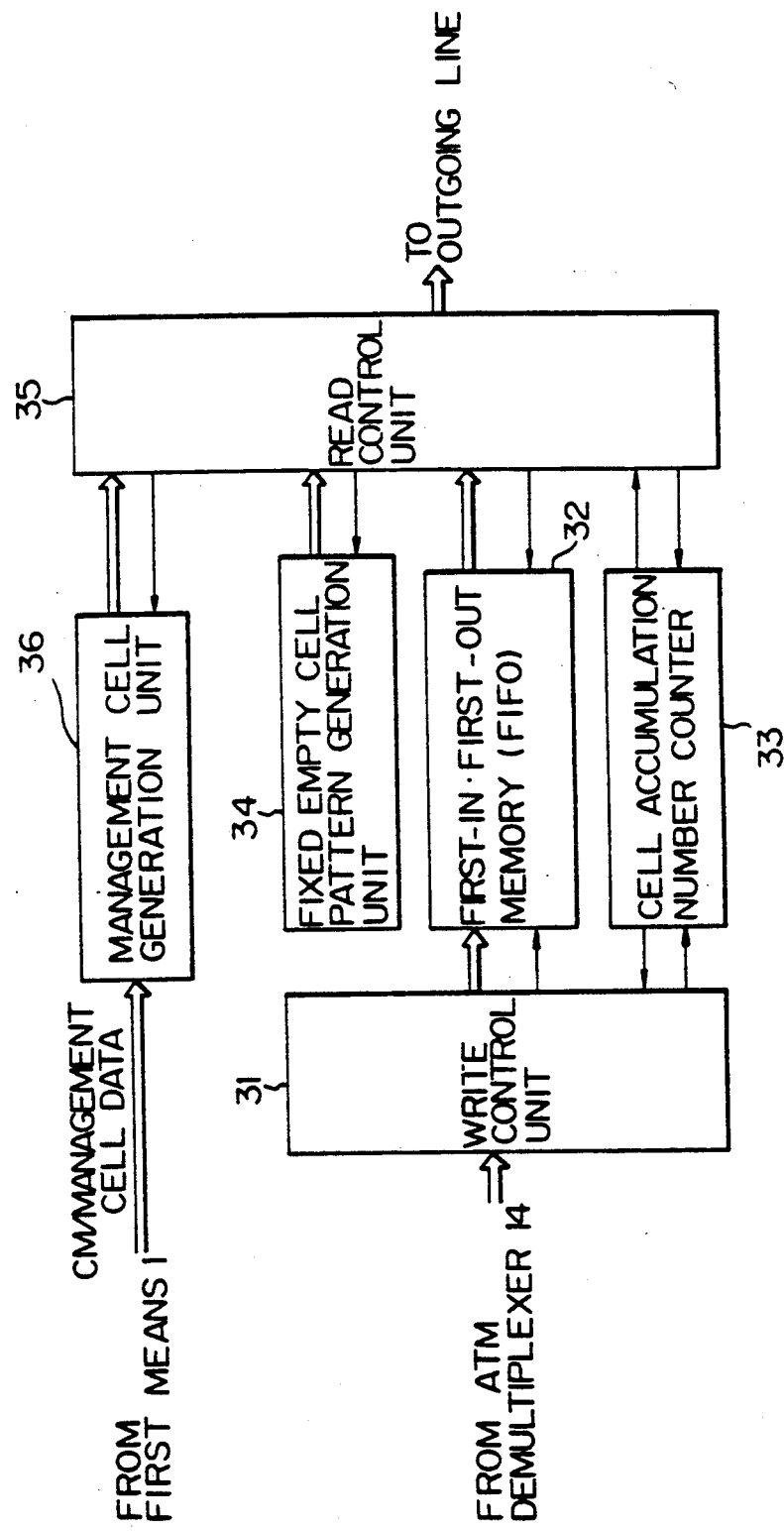
FIG. 7 shows a more detailed construction of the output side buffer unit shown in FIG. 6.

FIG. 7 illustrates a more detailed construction of the output side buffer unit shown in FIG. 6. As understood from FIG. 7, the construction of FIG. 7 corresponds to the construction of FIG. 4, with the addition of a management cell generation unit 36. The management cell generation unit 36 is composed of, for example, a fixed pattern generator producing fixed patterns of digital data. Because the content of the digital data is limited to a variety of fixed information such as the "SEND", "AIS", and the values of VPI, VCI, and PT, it is possible to employ a simple pattern generator.

Referring to FIG. 7, the management cell generation unit 36 receives the command CM for a generation of the management cell, together with the management cell data, both of which are received from the first means 1 for detecting the input management cell among the input ATM cells. The format of the cell will be clarified below.

Figure 8:
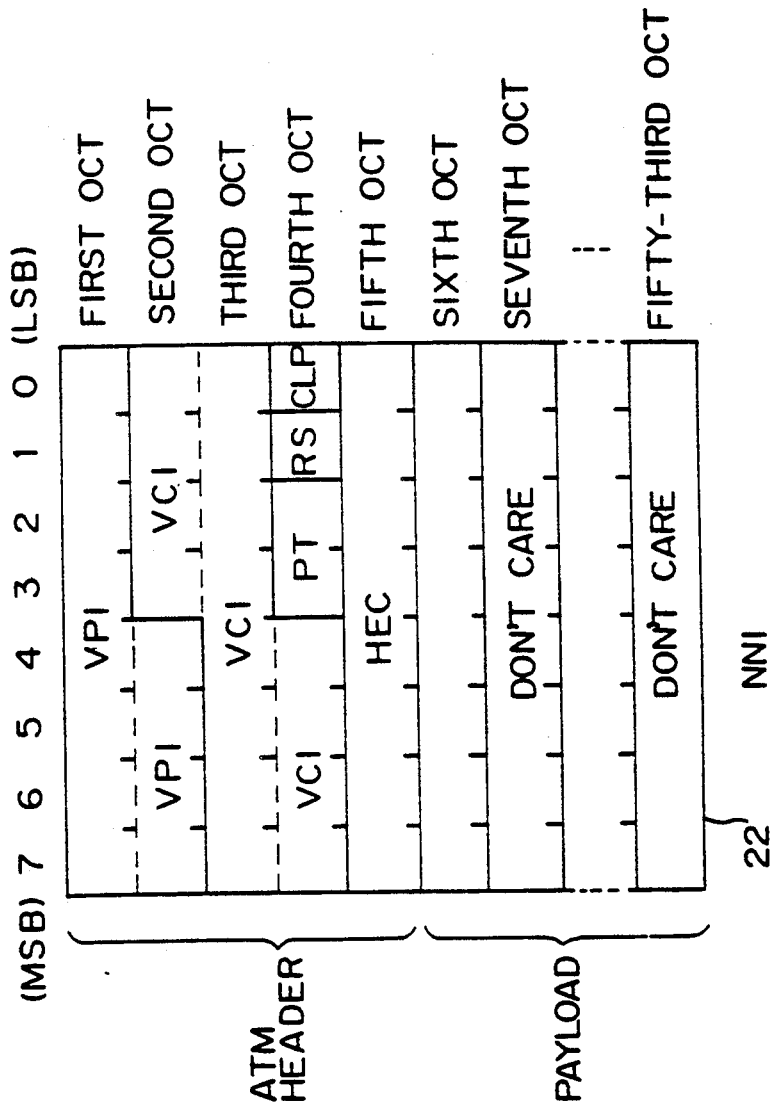
FIG. 8 depicts a format of an input management cell to be detected by the first means 1 of FIG. 6.

FIG. 8 depicts a format of an input management cell to be detected by the first means 1 of FIG. 6. Note that the format of this figure is set up by taking the cell of the aforesaid Node-Network Interface (NNI) 22 (see FIG. 3) as an example. In the format, if PT is a logic "11", the first means 1 detects the two bits "11", and thus determines that a management cell has appeared. In this case, the code "11" at PT is first allotted to indicate that it is a management cell. Conversely, a PT having the code "00" is first allotted to indicate that it is a usual user data cell.

The management cell data accompanied by the command CM and supplied, for making the aforesaid copy, to the management cell generation unit 36, should include the following pieces of information (a), (b) and (c), to thereby reproduce the input management cell as it is at the unit 36.

(a) VPI value
(b) VCI value
(c) Notifying information

The notifying information, inserted at the sixth OCT, contains the aforesaid "SEND", "AIS" and so on. Note, in FIG. 8, the characters "RS" denote a Reserve, the characters "HEC" denote a Header Error Control for performing a synchronization, and the characters "CLP" denote a Cell Loss Priority. The bits "RS" serve the user only, and therefore, in the management cell (which is not a user cell), the bits "RS" become "Don't Care". Conversely, the bit "CLP" of the management cell (which is not a user cell), assumes the logic "0" to indicate that the related cell is a high priority cell and must not be discarded.

Figure 9:
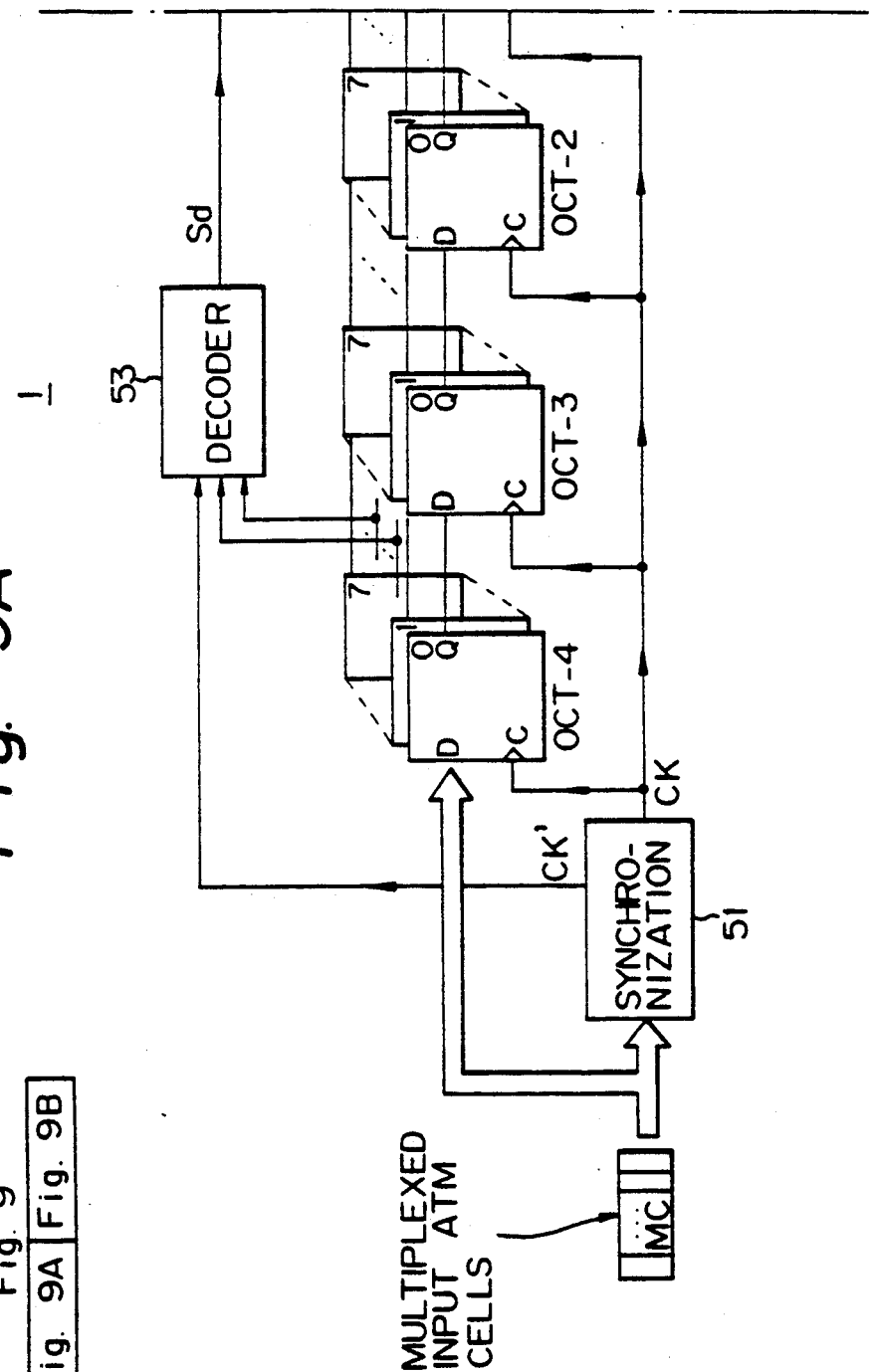
FIG. 9 shows how FIGS. 9A and 9B form a diagram of a detailed example of the first means 1 shown in FIG. 6.
Figure 9B:
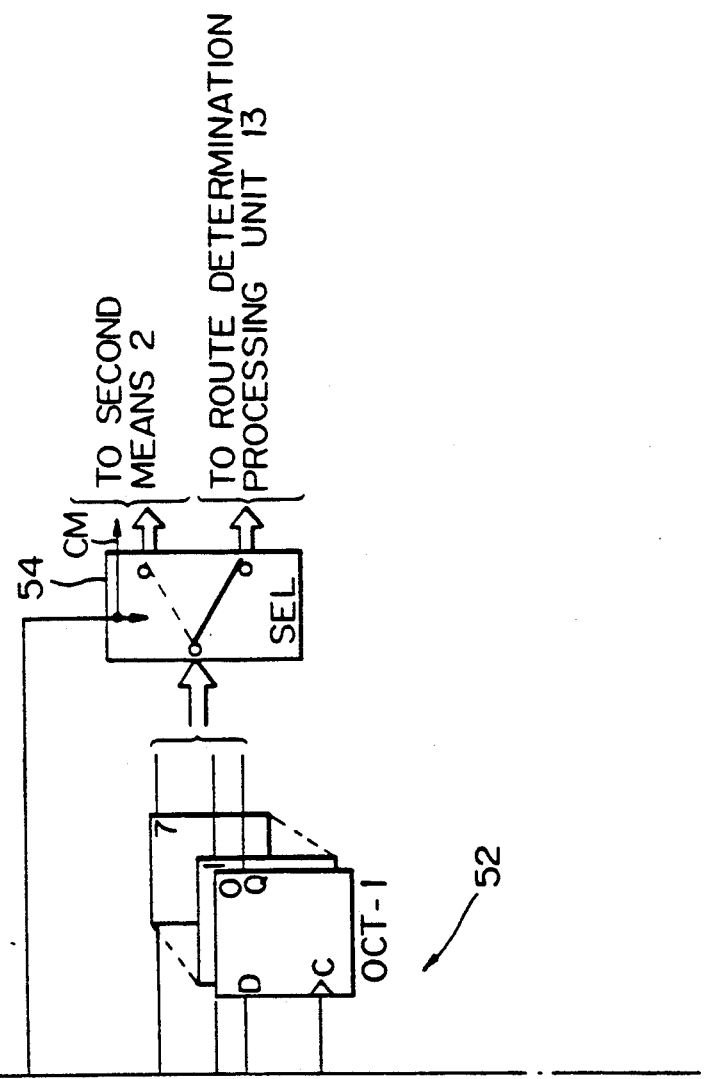

FIG. 9 shows a detailed example of the first means 1 shown in FIG. 6. The first means 1, shown in FIG. 6 for detecting the management cell among the multiplexed input ATM cells MC is composed of the members 51 through 54.

The member 51 is an ATM synchronization unit for establishing synchronization of each input ATM cell and producing a synchronized clock signal CK. The synchronized clock signal CK can be obtained by using the bits "HEC" as usual. The "HEC" is shown in FIG. 8.

The member 52 is comprised of buffer stages allotted to respective bytes of the ATM header, for continuously latching the bytes and shifting same in synchronization with the synchronized clock signal CK. As shown in FIG. 9, the four buffer stages correspond to the first octet (OCT-1) through the fourth octet (OCT-4) (see FIRST OCT through FOURTH OCT in FIG. 8), and each octet is constituted by one byte, i.e., eight bits 7 (MSB) through 0 (LSB). Each bit is latched by a flip-flop having a data input (D), a data output (Q), and a clock input (C) receiving the signal CK, and thus the four buffer stages 52 form the ATM header (see FIG. 8). The ATM header and the following payload are continuously shifted toward the right side of this figure, in synchronization with the clock CK. The first clock CK corresponds to the start of the ATM cell.

The member 53 is a decoder unit for decoding the logic bits at the particular bit position, to thereby determine the management cell having predetermined logic bits. As mentioned previously, the bits PT of each ATM cell (see FIG. 8) can be used for differentiating the management cell from the user ATM cell. For example, when the PT bits are "11", this indicates that the related ATM cell is a management cell. When the ATM cell synchronization unit 51 determines the particular bit position, e.g., the position at which the PT is mapped in the cell, the unit 51 produces another clock signal CK'. Upon receipt of the clock signal CK', the decoder unit 53 decodes the related bits (PT), and if the PT is the logic "11", the unit 53 outputs a signal $S_d$.

The member 54 is a selector for selectively dividing the input ATM cells MC and sending them to the route determination processing unit 13 or the second means 2; the latter means being selected when the decoder unit 53 determines that the input ATM cell is a management cell. Namely, when the unit 53 outputs the signal $S_d$, the selector 54 switches the path for transferring continuous bytes from the latch circuit (OCT-1) to the side of the second means 2. Alternatively, these bytes are directed to the route determination processing unit 13, i.e., the ATM switch.

Figure 10:
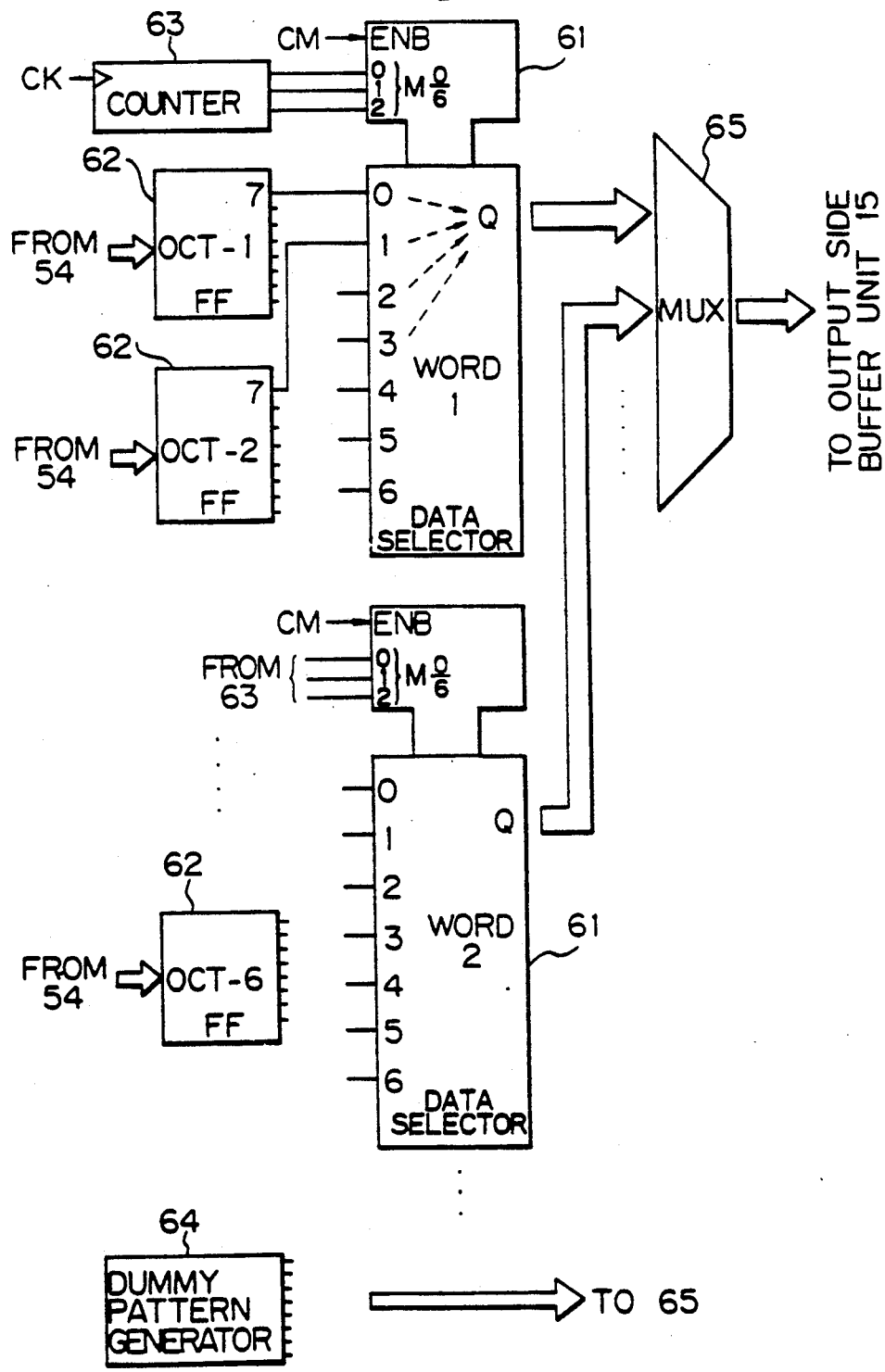
FIG. 10 shows a detailed example of the fixed pattern generator.

FIG. 10 illustrates a detailed example of the fixed pattern generator. As mentioned with reference to FIG. 7, the management cell generation unit 36 can be composed of a fixed pattern generator. The fixed pattern generator, i.e., the management cell generation unit 36, is composed of the members 61 through 65.

The member 62 is composed of flip-flops disposed at octets corresponding respectively to the ATM header and one of the octets of the payload carrying the management notifying information. Namely, the flip-flops (OCT-1, OCT-2 . . . OCT-6) 62 momentarily store the respective byte data mapped at the first octet through the sixth octet (see FIG. 8).

The member 61 is composed of selectors producing respective words consisting of each bit of the above octets. For example, the first selector (WORD 1) 61 outputs the word "a b c d e f" (see FIG. 8) along the bit "7" column. Similarly, the second selector (WORD 2) 61 outputs the six bits along the bit "6" column.

The member 63 is a counter used for sequentially selecting the bit data in each selector 61, one by one, in the order of the above octets, i.e., OCT-1, OCT-2, . . . OCT-6, so that each selected data is sequentially output from the output terminal Q. Since seven data sets are selected sequentially, the counter 63 has the value of three bits ($2^3 = 8$).

The member 64 is a dummy pattern generator used for producing a dummy data pattern. Regarding the management cell, the pieces of information at the first octet through the sixth octet are significant, but the remaining pieces of information at the seventh octet through the fifty-third octet are "Don't care" data, and thus the generator 64 produces the dummy data pattern as "Don't care" data.

The member 65 is a multiplexer for sequentially sending the outputs from the selectors 61 and the dummy pattern generator 65 to the output side buffer unit 15, where the dummy data is sent at the timing at which the payload data of the management cell is to be transferred, except for the notifying information.

Figure 11:
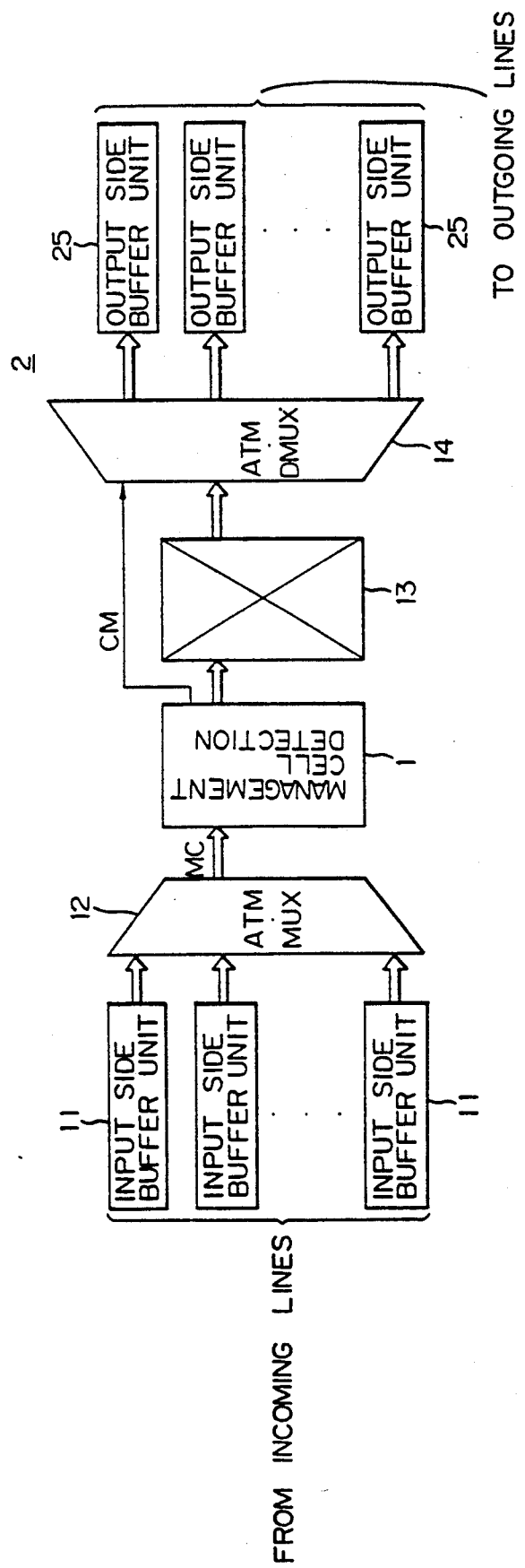
FIG. 11 illustrates an ATM exchange system according to the second embodiment of the present invention.

FIG. 11 illustrates an ATM exchange system according to the second embodiment of the present invention. In the second embodiment, the second means 2 of FIG. 5 is composed of modified output side buffer units 25 operated by the command CM output from the first means 1 for detecting the management cell among the multiplexed input ATM cells MC. The first means 1 issues the command CM when the appearance of the management cell is detected thereby.

Each of the output side buffer units 25 can be used as a first-in last-out memory (FILO) other than a usual first-in first-out (FIFO) memory (FIFO), where either FILO or FIFO is selected.

In a usual operation, FIFO is selected and handles the user ATM cells, but when the ATM cell (management cell) accompanied by the command CM is input to the output side buffer unit 25, the unit 25 is switched from FIFO to FILO.

In this case, FILO operates in reverse to the operation of the FIFO; i.e., last input data is output first. Accordingly, the management cell input last is output first from the corresponding output side buffer unit 25.

Accordingly, the aforesaid cell discard of the management cell cannot occur in the output side buffer units 25, and further, there is very little delay when the cell is passed through the output side buffer unit 25.

Figure 12:
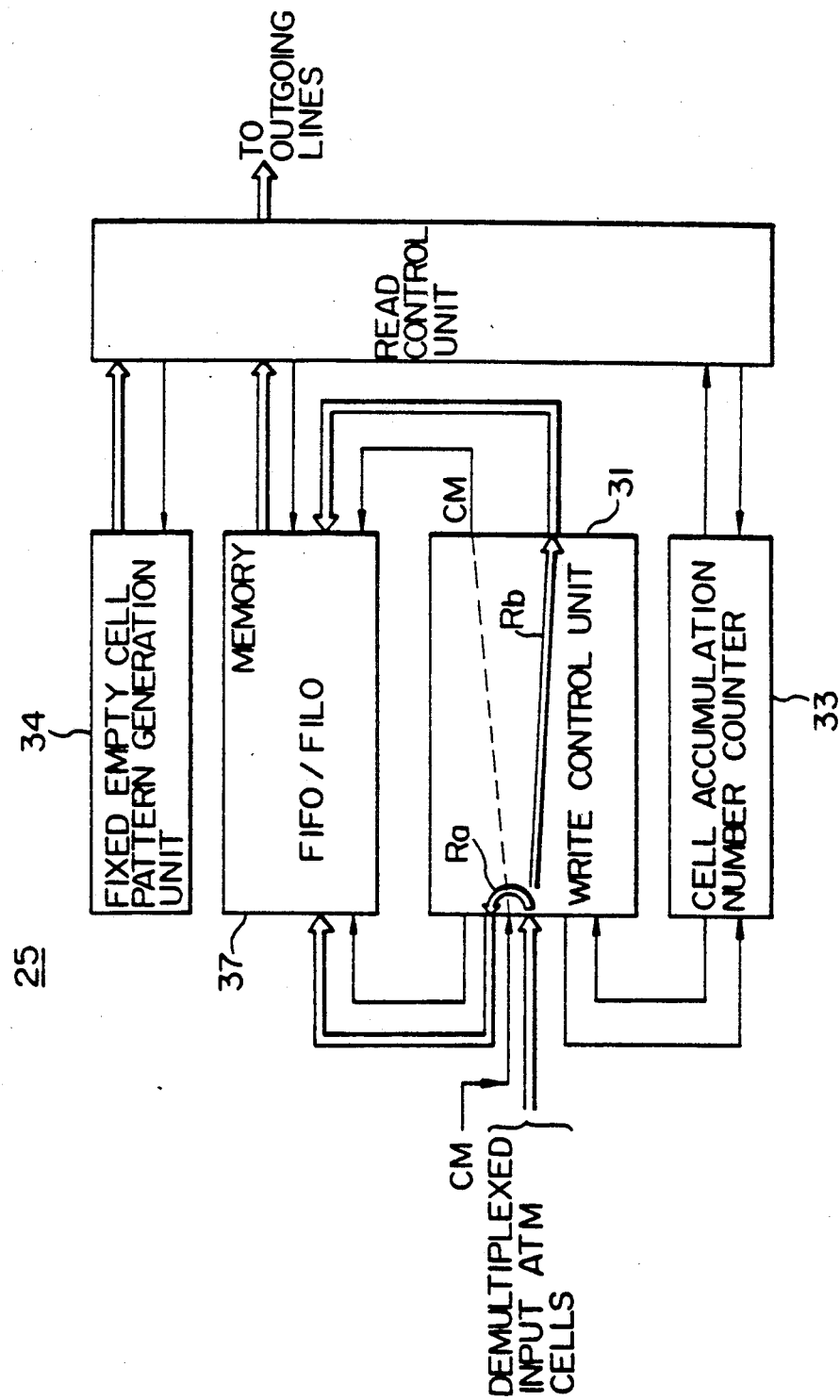
FIG. 12 illustrates an example of a structure of the output side buffer unit used in the second embodiment of the present invention.

FIG. 12 illustrates an example of a structure of the output side buffer unit used in the second embodiment of the present invention. The major part of this structure is similar to the structure shown in FIG. 4, with the exception of the use of the FIFO/FILO memory 37. The multiplexed input ATM cells MC are usually input to the FIFO in the memory 37 along a route $R_a$ controlled by the write control unit 31. Once the command CM is issued, the write control unit 31 changes the cell route from the route $R_a$ to a route $R_b$, and simultaneously, the write control unit 31 outputs the issued command CM to the FILO in the memory 37, to activate same. Accordingly, the related management cell is now loaded in the FILO.

Further, a read operation for the memory 37 is controlled by the read control unit 35, as mentioned before, and in this case, the unit 35 controls the memory 37 now acting as the FILO. Therefore, the management cell is first output and is promptly transferred, without any loss of the cell, over the corresponding outgoing line.

FIG. 13 shows a detailed example of the first means 1 shown in FIG. 11. Most of this structure is identical to the structure shown in FIG. 9, with the exception that, in FIG. 13, the ATM cells are all sent to the route determination processing unit 13 without distinguishing the management cell or the user ATM cell. The distinguishing of these cells is made at the write control unit 31, depending on the command CM.

The first means 1 monitors at all times a particular bit position, e.g. the aforesaid PT, in each input ATM cell, and detects the ATM cell as the management cell having predetermined logic bits, e.g. PT="11", at the particular bit position, so that the command for activation of the FILO is issued. Although the FIFO is more widely used in the electronics field than the FILO, both the FILO and the FIFO can be realized by, for example, a reversible queue register.

Figure 14A:
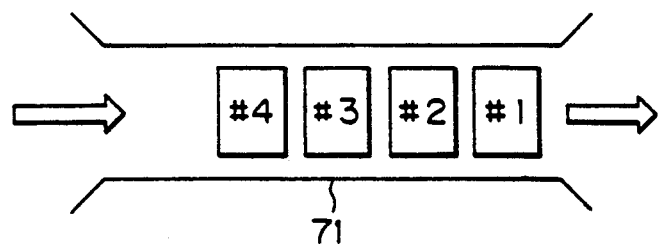
FIGS. 14A, 14B, 14C and 14D schematically illustrate the memory (FIFO/FILO) shown in FIG. 12.
Figure 14B:
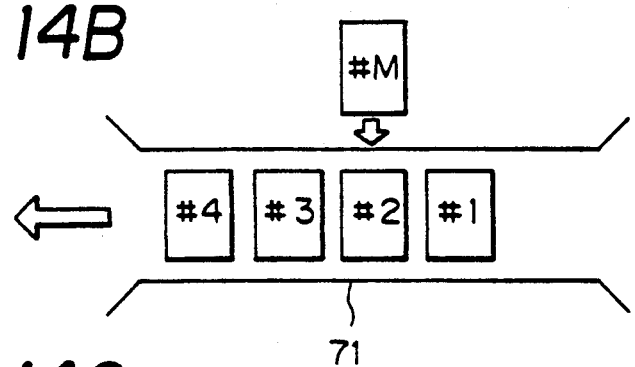
Figure 14C:
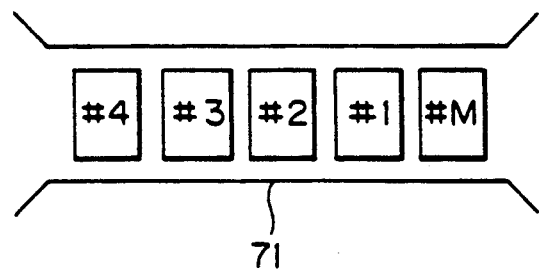
Figure 14D:
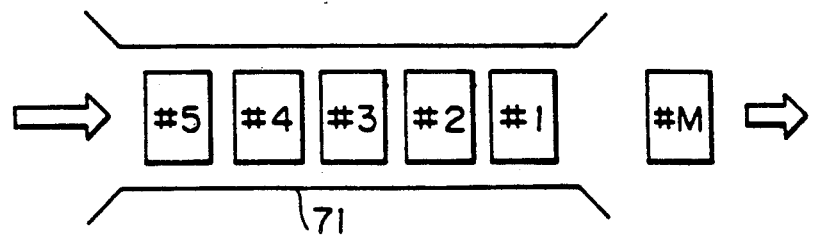

FIGS. 14A to 14D schematically illustrate the memory (FIFO/FILO) shown in FIG. 12. In FIG. 14A, the reversible queue register 71 stores therein the user ATM cells, e.g., #1, #2, #3, and #4. If the management cell #M is input, the register 71 operates in a reverse mode, as shown in FIG. 14B, and accordingly, the management cell #M is inserted to the register 71 at the outlet thereof, as shown in FIG. 14C, and finally, the management cell #M is output first as shown in FIG. 14D.

FIG. 15 illustrates an ATM exchange system according to the third embodiment of the present invention. According to the third embodiment of the present invention, the management cell is handled separately from the user ATM cell, and to accomplish this, an additional route determination processing unit 81 is introduced. The unit 81, i.e., an additional ATM switch, is dedicated to the management cell but is identical to the usual ATM switch 13. Further, a multiplexer 82 selects one of the outputs from the ATM switch 81, if the command CM is issued, or form the ATM switch 13.

In the third embodiment, the first means 1 can be identical to the first means used in the first embodiment, as seen in FIG. 9. In FIG. 9, however, at the right side, the "SECOND MEANS 2" is called the "ADDITIONAL ROUTE DETERMINATION PROCESSING UNIT 81".

As explained above in detail, the ATM exchange system of the present invention operates with a high reliability since, first, the important ATM cell, i.e., the management cell, is transmitted to the outgoing line without loss in the ATM exchange, and second, the management cell is promptly processed, i.e., before the user ATM cells, without a delay in the ATM exchange.

We claim:

1. An ATM exchange system comprising:
    a route determination processing unit for receiving multiplexed ATM cells from incoming lines and, for each of the ATM cells, determining a route to which said each ATM cell is to be switched;
    an ATM demultiplexing unit, coupled to said route determination processing unit, for receiving the ATM cells from said route determination processing unit and demultiplexing same;
    output side buffer units, coupled to said ATM demultiplexing unit, for momentarily storing the corresponding ATM cells sent from said ATM demultiplexing unit and transmitting the ATM cells over outgoing lines;
    first means located at the input side of said route determination processing unit for detecting a management cell amount the multiplexed ATM cells; and
    second means for creating a dedicated path, when said first means detects the management cell, for a transfer of only the detected management cell over a selected outgoing line.

2. An ATM exchange system as set forth in claim 1, wherein said second means is composed of management cell generation units disposed at each of said output side buffer units, wherein each of said management cell generation units generates a reproduced management cell in response to an input management cell being detected by said first means, wherein said reproduced management cells is analogous to the management cell detected by said first means, and wherein a selected management cell generation unit transmits the reproduced management cell over the selected outgoing line.

3. An ATM exchange system as set forth in claim 2, wherein said first means issues a command for generation of a management cell analogous to the management cell detected by said first means, wherein said command is accompanied by payload data and header data contained in the detected input management cell, and wherein the selected management cell generation unit is activated by the command to reproduce the analogous management cell.

4. An ATM exchange system as set forth in claim 3, wherein each of said management cell generation units is a fixed pattern generator for producing predetermined fixed patterns of data corresponding to the management cells detected by said first means.

5. An ATM exchange system as set forth in claim 4, wherein said fixed pattern generator selectively produces one of the predetermined fixed patterns representing regulated information of "SEND" and "AIS", and values VPI, VCI and PT.

6. An ATM exchange system as set forth in claim 4, wherein the payload data and the ATM header data are organized in order in octets, and wherein said fixed pattern generator is composed of:

- flip-flops disposed at octets corresponding respectively to the header data and one of the octets of the payload data carrying notifying information regarding the management cell;
- selectors, coupled to said flip-flops to produce words respectively including each bit of the octets;
- a counter, coupled to said selectors, for sequentially selecting the bit data in each of said selectors, one by one, in the order of the octets;
- a dummy pattern generator for producing a dummy data pattern;
- a multiplexer, coupled to said selectors and said dummy pattern generator, for sequentially sending the outputs from said selectors and said dummy pattern generator to one of said output side buffer units, where the dummy data is sent when the payload data of the management cell is to be transferred, except for said notifying information.

7. An ATM exchange system as set forth in claim 3, wherein said first means monitors at all times a particular bit position in each of the multiplexed ATM cells and detects the ATM cell operating as the management cell and having a predetermined logic bits at the particular bit position, so that the command for a generation of the analogous management cell is issued.

8. An ATM exchange system as set forth in claim 7, wherein the particular bit position is set by utilizing an existing Payload Type code.

9. An ATM exchange system as set forth in claim 7, wherein the ATM header data is arranged in bytes, and wherein said first means for detecting a management cell among the multiplexed ATM cells is composed of:

- an ATM cell synchronization unit for establishing a synchronization of each of the multiplexed ATM cells and producing a synchronized clock signal;
- buffer stages, coupled to said synchronization unit and allotted to respective bytes of the header data, for continuously latching the bytes and shifting same in synchronization with the synchronized clock signal;
- a decoder unit, coupled to one of said buffer stages corresponding to the particular bit position, for decoding said logic bits at the particular bit position to determine the management cell having predetermined logic bits; and
- a selector, coupled to said decoder unit and said route determination processing unit, for selectively dividing the multiplexed ATM cells and sending same to said route determination processing unit and to said second means, where the second means is selected when said decoder unit determines that the multiplexed ATM cell is a management cell.

10. An ATM exchange system as set forth in claim 1, wherein said second means is composed of FILO memories each mounted inside the respective output side buffer units, said FILO memories being activated each time one of the management cells is detected by said first means.

11. An ATM exchange system as set forth in claim 10, wherein said first means issues a command for an activation of each of said first-in last-out memories (FILO) in said output side buffer units.

12. An ATM exchange system as set forth in claim 11, wherein said first means monitors at all times a particular bit position, in each multiplexed ATM cell and detects the multiplexed ATM cell as a management cell having predetermined logic bits, at the particular bit position, so that the command for an activation of one of said FILO memories is issued.

13. An ATM exchange system as set forth in claim 10, wherein said FILO memories are composed of a reversible queue register.

14. An ATM exchange system as set forth in claim 1, wherein said second means is composed of an additional route determination processing unit and a multiplexer selectively outputting ATM cells from one of said route determination processing unit and said additional route determination processing unit, depending on a command issued from said first means when said first means detects the management cell, wherein the additional route determination unit is dedicated to the management cell.

15. An ATM exchange system as set forth in claim 14, further comprising ATM header data arranged in bytes, wherein said first means for detecting a management cell among the multiplexed ATM cells is composed of:

- an ATM cell synchronization unit for establishing a synchronization of each of the multiplexed ATM cells and producing a synchronized clock signal;
- buffer stages, coupled to said ATM cell synchronization unit and allotted to respective bytes of the ATM header data for continuously latching the bytes and shifting same in synchronization with the synchronized clock signal.
- a decoder unit, coupled to one of said buffer stages corresponding to the particular bit position, for decoding the logic bits at the particular bit position to determine a management cell having predetermined logic bits; and
- a selector, coupled to said decoder unit, said route determination processing unit and said additional route determination processing unit, for selectively dividing the multiplexed ATM cells and sending same to said route determination processing unit and to said additional route determination processing unit, wherein said additional route determination processing unit is selected when said decoder unit determines that the multiplexed ATM cell is a management cell.

16. An ATM machine exchange method comprising the steps of:

- receiving ATM cells from incoming lines and determining, for each of the ATM cells, a route to which each ATM cell is to be switched;
- momentarily storing the ATM cells and transmitting the ATM cells over outgoing lines;
- detecting a management cell from among the ATM cells; and
- creating a dedicated path, when the management cell is detected, for a transfer of only the detected management cell over a selected one of the outgoing lines.

* * * * *

UNITED STATES PATENT AND TRADEMARK OFFICE
CERTIFICATE OF CORRECTION

PATENT NO. : 5,287,349
DATED : FEBRUARY 15, 1994
INVENTOR(S) : Ryuji HYODO, et al.

It is certified that error appears in the above-indentified patent and that said Letters Patent is hereby corrected as shown below:

Col. 10, line 33, "amount" should be -- among --.

Col. 12, line 34, "signal." should be --signal;--.

Signed and Sealed this

Tenth Day of January, 1995

BRUCE LEHMAN

Attest:

Attesting Officer

Commissioner of Patents and Trademarks